US009681450B2

United States Patent
Shiva et al.

(10) Patent No.: US 9,681,450 B2
(45) Date of Patent: Jun. 13, 2017

(54) RADIO RESOURCE SIGNALING DURING NETWORK CONGESTION IN A MOBILE WIRELESS DEVICE

(71) Applicant: APPLE INC., Cupertino, CA (US)

(72) Inventors: Sundararaman Shiva, Los Gatos, CA (US); Longda Xing, San Jose, CA (US); Jianxiong Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 488 days.

(21) Appl. No.: 13/677,047

(22) Filed: Nov. 14, 2012

(65) Prior Publication Data

US 2013/0070598 A1  Mar. 21, 2013

Related U.S. Application Data

(63) Continuation of application No. 12/959,111, filed on Dec. 2, 2010, now abandoned.

(Continued)

(51) Int. Cl.
*H04W 4/00* (2009.01)
*H04W 72/04* (2009.01)
(Continued)

(52) U.S. Cl.
CPC ... *H04W 72/0486* (2013.01); *H04W 28/0205* (2013.01); *H04W 72/1252* (2013.01);
(Continued)

(58) Field of Classification Search
CPC ......... H04W 28/0205; H04W 28/0252; H04W 28/0284; H04W 28/0289; H04W 72/04;
(Continued)

(56) References Cited

U.S. PATENT DOCUMENTS 5,313,454 A   5/1994 Bustini et al.
5,446,730 A   8/1995 Lee et al.
(Continued)

FOREIGN PATENT DOCUMENTS

EP   2 040 432 A1   3/2009
WO   WO 2005/057981   6/2005
(Continued)

OTHER PUBLICATIONS

PCT International Search Report dated Sep. 27, 2011 in PCT Application No. PCT/US2011/042961.
(Continued)

*Primary Examiner* — Alpus H Hsu
(74) *Attorney, Agent, or Firm* — Downey Brand LLP

(57) ABSTRACT

A method for radio link control in a mobile wireless communication device. The mobile wireless device transmits a sequence of service requests to establish radio resources with a wireless communication network for a data packet in a pending data buffer. When no radio resources are allocated in response to the transmitted sequence of service requests, the mobile wireless device sets a minimum threshold for the pending data buffer, discards all pending data packets above the minimum threshold and discards the oldest pending data packet. The mobile wireless device repeats transmitting and discarding until a radio resource is allocated or the pending data packet buffer is empty. A retry interval between successive service requests is increased after transmitting each sequence of service requests until reaching a maximum retry interval value.

12 Claims, 12 Drawing Sheets

Related U.S. Application Data

(60) Provisional application No. 61/362,662, filed on Jul. 8, 2010.

(51) Int. Cl.
*H04W 72/12* (2009.01)
*H04W 28/02* (2009.01)
H04W 76/02 (2009.01)
H04W 88/02 (2009.01)

(52) U.S. Cl.
CPC ........ *H04W 72/04* (2013.01); *H04W 72/0413* (2013.01); *H04W 76/027* (2013.01); *H04W 88/02* (2013.01)

(58) Field of Classification Search
CPC ......... H04W 72/0406; H04W 72/0413; H04W 72/0486; H04W 72/1252; H04W 76/027; H04W 76/028; H04W 76/06; H04W 76/066; H04W 88/02; H04L 47/14; H04L 47/50; H04L 47/70; H04L 47/78
See application file for complete search history.

(56) References Cited

U.S. PATENT DOCUMENTS

| | | | |
|---|---|---|---|
| 5,926,459 A | 7/1999 | Lyles et al. | |
| 5,961,605 A | 10/1999 | Deng et al. | |
| 6,272,550 B1 | 8/2001 | Deng et al. | |
| 6,359,861 B1 | 3/2002 | Sui et al. | |
| 6,490,251 B2 | 12/2002 | Yin et al. | |
| 6,563,790 B1* | 5/2003 | Yu ........................... | H04L 47/10 370/230 |
| 6,701,389 B2 | 3/2004 | Gorti et al. | |
| 6,725,270 B1* | 4/2004 | Yu ........................... | H04L 12/413 370/230 |
| 6,845,100 B1* | 1/2005 | Rinne ..................... | H04L 47/10 370/395.43 |
| 6,847,610 B1* | 1/2005 | Suumaki ............. | H04L 12/5695 370/230.1 |
| 6,980,511 B1 | 12/2005 | Li et al. | |
| 6,980,516 B1* | 12/2005 | Wibowo ................. | H04L 47/10 370/235 |
| 7,013,419 B2 | 3/2006 | Kagan et al. | |
| 7,069,356 B2 | 6/2006 | Meyer et al. | |
| 7,289,504 B1* | 10/2007 | Hippelainen ..... | H04L 29/12216 370/338 |
| 7,319,678 B2 | 1/2008 | Tsuda et al. | |
| 7,391,785 B2 | 6/2008 | Chang et al. | |
| 7,426,575 B1 | 9/2008 | Reissfelder et al. | |
| 7,457,270 B2* | 11/2008 | Tsao ...................... | H04W 28/08 370/310.2 |
| 7,483,989 B2* | 1/2009 | Williams ................ | H04L 29/06 709/227 |
| 7,631,239 B2 | 12/2009 | Yeo et al. | |
| 7,664,017 B2 | 2/2010 | Sagfors | |
| 7,693,070 B2 | 4/2010 | Rider et al. | |
| 7,761,592 B2 | 7/2010 | Buriano et al. | |
| 7,796,608 B2* | 9/2010 | Rawlins ............. | H04L 12/5695 370/351 |
| 7,953,002 B2 | 5/2011 | Opsasnick | |
| 8,005,041 B2* | 8/2011 | Speight ................... | H04L 47/10 370/329 |
| 8,081,609 B2* | 12/2011 | Balachandran ......... | H04L 47/10 370/241 |
| 8,300,575 B2* | 10/2012 | Willars ................... | H04L 47/10 370/328 |
| 8,369,288 B2* | 2/2013 | Zhou ..................... | H04W 72/04 370/329 |
| 8,428,026 B2* | 4/2013 | Speight ................... | H04L 47/10 370/236 |
| 8,452,327 B2* | 5/2013 | Liu ......................... | H04W 8/18 370/331 |
| 8,493,932 B2* | 7/2013 | Zhou ................... | H04W 76/022 370/331 |
| 8,787,311 B2* | 7/2014 | Lerzer ................. | H04W 76/021 370/331 |
| 8,811,423 B2* | 8/2014 | Rawlins ............. | H04L 12/5695 370/230.1 |
| 8,812,673 B2* | 8/2014 | Balachandran ......... | H04L 47/10 709/226 |
| 9,357,450 B2* | 5/2016 | Eisl ..................... | H04W 36/0072 |
| 2002/0199008 A1 | 12/2002 | Pecen et al. ................... | 709/231 |
| 2004/0042491 A1* | 3/2004 | Sarkkinen ............. | H04L 1/1642 370/469 |
| 2004/0071086 A1* | 4/2004 | Haumont et al. ............. | 370/230 |
| 2005/0174965 A1* | 8/2005 | Sarkkinen ........... | H04L 12/5695 370/329 |
| 2006/0256723 A1 | 11/2006 | Hellenthal | |
| 2007/0064709 A1* | 3/2007 | Holmstrom et al. ...... | 370/395.2 |
| 2007/0121504 A1 | 5/2007 | Hellenthal et al. | |
| 2007/0253365 A1* | 11/2007 | Hedberg et al. .............. | 370/329 |
| 2008/0095101 A1 | 4/2008 | Tsuda et al. | |
| 2008/0191816 A1* | 8/2008 | Balachandran et al. .... | 333/24 R |
| 2008/0267143 A1 | 10/2008 | Pasanen et al. | |
| 2008/0291872 A1* | 11/2008 | Henriksson ................... | 370/329 |
| 2009/0034547 A1 | 2/2009 | Choi et al. | |
| 2010/0008305 A1 | 1/2010 | Yeo et al. | |
| 2010/0202469 A1 | 8/2010 | Isaksson et al. | |
| 2010/0296525 A1 | 11/2010 | Mahkonen | |
| 2011/0058475 A1 | 3/2011 | Nilsson et al. | |
| 2011/0255404 A1* | 10/2011 | Kafka ................. | H04L 41/0896 370/232 |

FOREIGN PATENT DOCUMENTS

| | | |
|---|---|---|
| WO | WO2005065151 | 7/2005 |
| WO | WO 2005/104460 | 11/2005 |
| WO | WO2006015474 | 2/2006 |
| WO | WO2007022791 | 3/2007 |

OTHER PUBLICATIONS

PCT Written Opinion dated Sep. 27, 2011 in PCT Application No. PCT/US2011/042961.

Lucent Technologies, "Clarification of Re-Establishment of preserved RABs", 3GPP Draft; 23060-690-Preservation-CRV2, $3^{RD}$ Generation Partnership Project (3GPP), Mobile Competence Center, 650, Route Des Lucioles, F-06921 Sophia-Antipolis Cedex, France, Sep. 5, 2005.

Ericsson et al., "Re-establishment of RABs after preservation", 3GPP Draft; C1-102327_PRESERVATION_REL8, $3^{rd}$ Generation Partnership Project (3GPP), Mobile Competence Center, 650, Route Des Lucioles. F-06921 Sophia-Antipolis Cedex, France, Jul. 5, 2010.

Siemens, "Re-establishment of Preserved Real-Time PDP Context", 3GPP Draft, 52-021250. $3^{rd}$ Generation Partnership Project (3GPP), Mobile Competence Center, 650, Route Des Lucioles, F-06921 Sophia-Antipolis Cedex, France, May 2, 2005.

Taiwanese Patent Application No. 100124095—Office Action dated Apr. 9, 2014.

\* cited by examiner

RADIO RESOURCE SIGNALING DURING NETWORK CONGESTION IN A MOBILE WIRELESS DEVICE

PRIORITY AND RELATED APPLICATIONS

This patent application is a continuation of and claims priority to co-owned, co-pending U.S. patent application Ser. No. 12/959,111 entitled "RADIO RESOURCE SIGNALING DURING NETWORK CONGESTION IN A MOBILE WIRELESS DEVICE", filed Dec. 2, 2010 which claims priority under 35 U.S.C. §119(e) to U.S. Provisional Patent Application Ser. No. 61/362,662 entitled, "METHOD AND APPARATUS FOR RADIO RESOURCE SIGNALING DURING NETWORK CONGESTION IN A MOBILE WIRELESS DEVICE" by Shiva, et al. filed Jul. 8, 2010 each of which is incorporated by reference herein in its entirety for all purposes.

TECHNICAL FIELD

The described embodiments relate generally to wireless mobile communications. More particularly, a method and apparatus is described for radio resource signaling during periods of radio access network congestion in a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem (RNS) located in the cell. The radio network subsystem can include a base transceiver station (BTS) in a Global System for Communications (GSM) network or a Node B in a Universal Mobile Telecommunications System (UMTS) network. Whether idle or actively connected, a mobile wireless communication device can be associated with a "serving" cell in a wireless communication network and be aware of neighbor cells to which the mobile wireless communication device can also associate.

Mobile wireless communication devices can support both voice and data connections, in some cases simultaneously, through radio resources allocated by the radio network subsystem for a radio access portion of the wireless communication network. The voice and data connections can also include paths through circuit switched and/or packet switched domains of a core network that interconnects the mobile wireless communication device to a public switched telephone network (PSTN) and/or a public data network (PDN). In order for the data connection to route packets, also known as protocol data units (PDUs), between the mobile wireless communication device and the packet data network, a packet data protocol (PDP) context can be activated. As several different network elements can be involved in activating the PDP context and because establishing the PDP context can require a user discernable amount of time, it can be preferable to maintain the PDP context even after the data connection becomes idle when there are no data packets to transmit. Radio resources in the radio access network, however, can be scarce, and the wireless communication network can release the radio resources allocated for the data connection during an idle period while maintaining the PDP context, thus placing the data connection in a preservation mode. When new data packets arrive at the mobile wireless communication device for transmission to the public data network, new radio resources can then be allocated by the radio network subsystem over which to transport the new data packets.

During periods with high communication traffic in the radio access network, the radio network subsystem can choose to not allocate new radio resources to the mobile wireless communication device required for the data connection. In this situation, the PDP context can remain active, while the underlying data connection to support transport of the packets can be unavailable. The mobile wireless communication device can then accumulate unsent data packets in a pending data buffer and repeatedly submit service requests for radio resources until the radio resources are allocated by the radio network subsystem. These repeated service requests can add unnecessary levels of signaling traffic to an already overloaded radio access network.

Thus there exists a need to modify radio resource signaling between the mobile wireless communication device and the radio network subsystems of the wireless communication network during periods of radio access network congestion.

SUMMARY OF THE DESCRIBED EMBODIMENTS

The described embodiments relate generally to wireless mobile communications. More particularly, a method and apparatus is described for radio resource signaling during periods of radio access network congestion in a mobile wireless communication device.

In one embodiment, a method for radio link control in a mobile wireless device can include at least the following steps. While a packet data protocol context between the mobile wireless device and while a wireless communication network is active and no radio resources are allocated by the wireless communication network on which to transmit data packets, the mobile wireless device executes the following steps repeatedly when pending data packets exist in a pending data packet buffer. A retry counter is set to a non-zero maximum integer retry value after receiving each new data packet to transmit. A transceiver in the mobile wireless device transmits a service request to establish radio resources between the mobile wireless communication device and the wireless communication network when the retry counter is non-zero. After transmitting each service request to establish radio resources, the retry counter is decremented.

In another embodiment, a method for radio link control in a mobile wireless device can include at least the following steps. For a data packet in the pending data packet buffer, the mobile wireless device transmits a sequence of service requests to establish radio resources between the mobile wireless device and a wireless communication network. When no radio resources are allocated by the wireless communication network in response to the transmitted sequence of service requests, a threshold for the pending data packet buffer is set to a minimum threshold value. All pending data packets above the set threshold and the oldest pending data packet in the pending data packet buffer are discarded. The transmitting and discarding steps are repeated until a radio resource is allocated by the wireless communication network or the pending data packet buffer is empty.

In yet another embodiment, a mobile wireless device is described. The mobile wireless device includes an application processor configured to generate data packets and a transceiver configured to receive data packets from the application processor and to transmit data packets to a wireless communication network. The transceiver is configured to reset a retry counter to a non-zero maximum integer retry value after receiving each new data packet to transmit. When no radio resources are allocated by the wireless communication network on which to transmit the data packets, and when the retry counter is non-zero, the transceiver is configured to transmit a service request to establish radio resources between the mobile wireless device and the wireless communication network. The transceiver is configured to decrement the retry counter after transmitting each service request to establish radio resources.

In a further embodiment, a non-transitory computer readable medium for storing non-transitory computer program code executable by a processor in a mobile wireless device includes at least the following. Non-transitory computer program code for transmitting a sequence of service requests to establish radio resources between the mobile wireless device and a wireless network after receiving a data packet in a pending data buffer. Non-transitory computer program code for discarding at least one pending data packet in the pending data packet buffer when no radio resources are allocated in response to the transmitted sequence of service requests. Non-transitory computer program code for repeating the transmitting and the discarding until a radio resource is allocated by the wireless network or the pending data packet buffer is empty.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
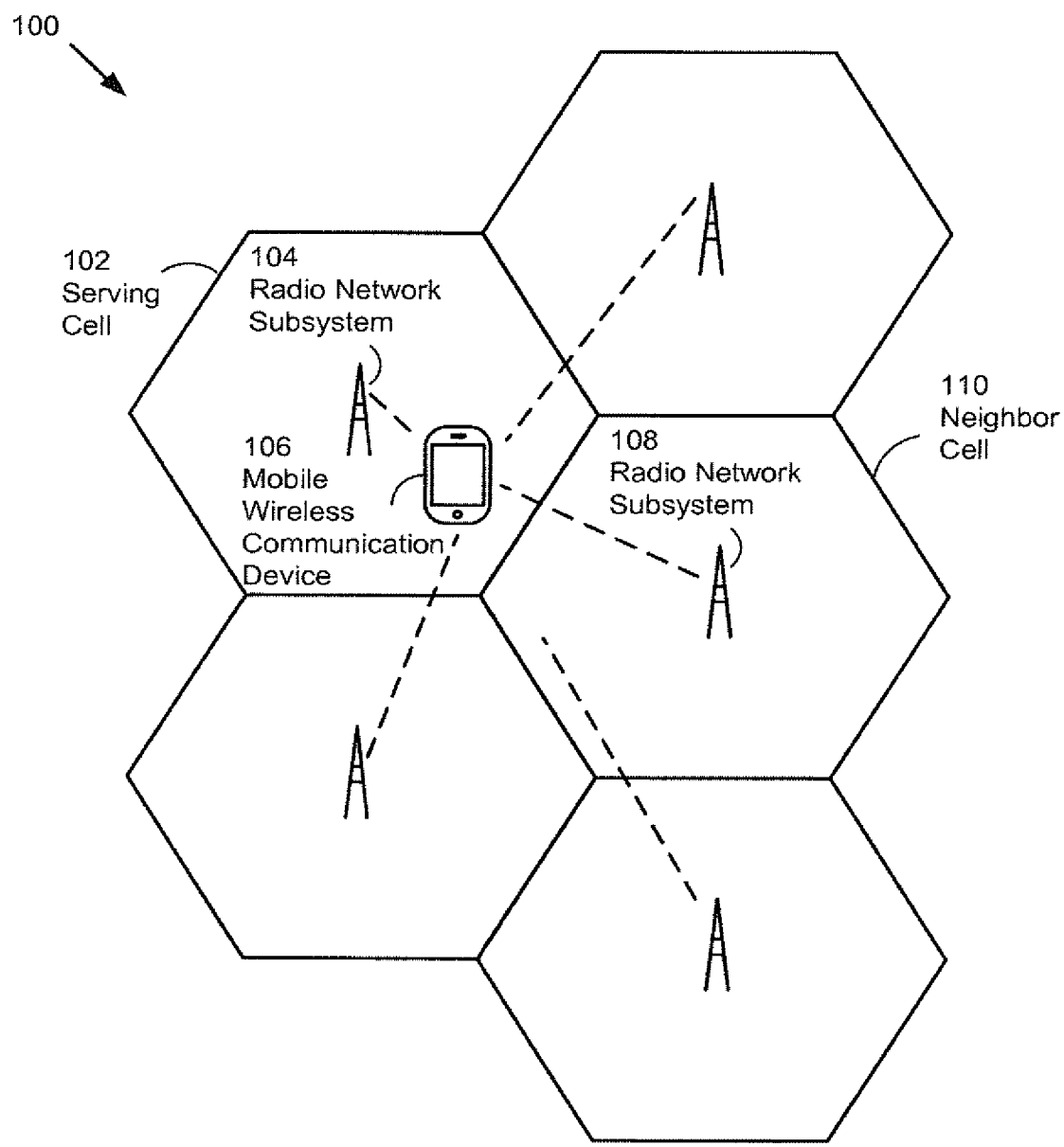
FIG. 1 illustrates a mobile wireless communication device located within a wireless cellular communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless communication devices can provide a multiplicity of services including both voice and data connections through wireless communication networks. A data connection between a mobile wireless communication device and an external data network, through a wireless communication network, can be considered "active" when the mobile wireless communication device is "attached" to the wireless communication network and when a "higher layer" packet data protocol (PDP) context is established. Radio access network resources, such as radio access bearers (RABs) can be used to transport packets, also called protocol data units (PDUs), between the mobile wireless communication device an radio network subsystems in a radio access portion of the wireless communication network. Radio resources can be shared among multiple mobile wireless communication devices, and with limited radio frequency bandwidth allocated for the radio access portion of the wireless communication network, the radio access bearers can be released from the mobile wireless communication device and can be re-allocated when the data connection becomes idle. The PDP context can remain active, even though radio resources can be not allocated. This condition can be known as a "preservation mode."

With the PDP context active, higher layer processes in the mobile wireless communication device can continue to send data packets to lower layer processes for transmission to the wireless communication network; however, without radio resources allocated by the wireless communication network, the data packets can accumulate in a pending data buffer. Each new data packet in the pending data buffer can trigger a service request from the mobile wireless communication device to a radio network subsystem (RNS) in the wireless communication network for radio resources. During periods of network congestion, e.g. when insufficient radio resources can be available for service requests from the mobile wireless communication device, radio resources can be not allocated. The mobile wireless communication device can then resubmit a service request for radio resources up to a maximum number of retries for each pending packet in the pending data buffer. A high number of pending higher layer data packets can result in a large number of service request retries. Such a sequence of service requests can add a significant signaling load on the radio access portion of the wireless communication network that can be already congested.

One or more different steps can be taken alone or in combination to limit the number of service requests and lower the signaling load on the radio access network during a period of congestion in the radio access portion of the wireless communication network. First, as requested radio resources can be used by the mobile wireless communication device to transmit any pending data packets, service requests for multiple pending data packets can be consolidated together, thereby limiting the total number of service requests per pending data packet. Second, the number of pending data packets can be limited by lowering thresholds on the pending data buffer, thereby discarding older data packets sooner, even when no specific service request has been made for that pending data packet. Third, the time between successive service requests can be increased after each series of service request retries for a pending data packet in order to spread the signaling load over a longer time period. In combination with limiting the number of pending data packets in the pending data buffer, service requests can be both fewer in total and less frequent in occurrence. The retry interval between service requests can be limited to a maximum number to ensure that when network congestion clears, the mobile wireless communication device can receive a response to a service request in a timely manner. Additional details of the method and apparatus to modify radio resource signaling between the mobile wireless communication device and the radio network subsystem of the wireless communication network during radio access network congestion can is described in the following.

FIG. 1 illustrates a wireless communication network 100 of overlapping wireless communication cells to which a mobile wireless communication device 106 can connect. Each wireless communication cell can cover a geographic area extending from a centralized radio network subsystem. The mobile wireless communication device 106 can receive communication signals from a number of different cells in the wireless communication network 100, each cell located at a different distance from the mobile wireless communication device 106. The mobile wireless communication device 106 can be connected to a radio network subsystem 104 in a serving cell 102 and can be aware of neighbor cells in the wireless communication network 100, such as radio network subsystem 108 in neighbor cell 110. The radio resources that connect the mobile wireless communication device 106 to a cell can be limited and shared among multiple mobile wireless communication devices.

Figure 2:
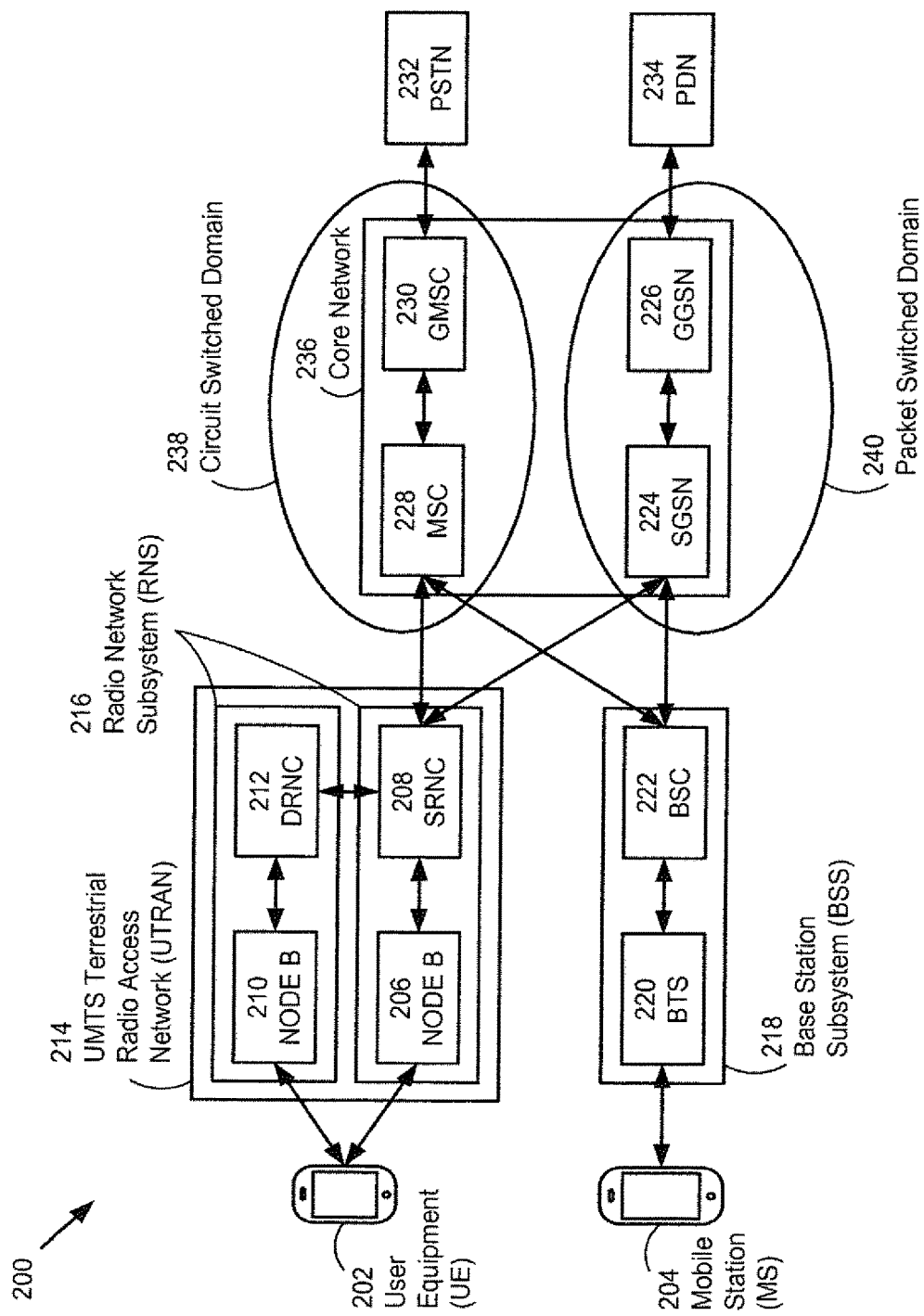
FIG. 2 illustrates a hierarchical architecture for a wireless communication network.

FIG. 2 illustrates a hybrid hierarchical architecture 200 for a wireless communication network that includes both UMTS and GSM radio access network elements. A mobile wireless communication device 106 operating in a GSM wireless communication network can be referred to as a mobile station (MS) 204, while a mobile wireless communication device 106 operating in a UMTS network can be referred to as user equipment (UE) 202. (Wireless mobile communication devices 106 can include the capability of connecting to multiple wireless communication networks that use different wireless radio network technologies, such as to a GSM network and to a UMTS network; thus the description that follows can also apply to such "multi-network" devices as well as single network devices.) The MS 204 can connect to the GSM wireless communication network through a radio network subsystem known as a base station subsystem (BSS) 218. The BSS 218 can include a base transceiver station (BTS) 220 that transmits and receive radio frequency signals between the MS and the wireless communication network and a base station controller (BSC) that manages the communication between a core network 236 and the MS 204. In a GSM wireless communication network, an MS 204 can be connected to one BSS at a time. As the MS 204 moves throughout the GSM wireless communication network, the BSC 222 can manage handover of the MS 204 to different BTS 220 located in different cells. The GSM radio access network BSS 218 connects to a centralized core network 236 that provides circuit switching and packet switching capabilities. The packet switching capability can provide a General Packet Radio Service (GPRS) that transmits internet protocol (IP) packets between the MS 204 and external data networks.

The core network 236 can include a circuit switched domain 238 that can carry voice traffic to and from an external public switched telephone network (PSTN) and a packet switched domain 240 that can carry data traffic to and from an external public data network (PDN). The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The core network 236 can be commonly used by multiple radio link access network subsystems that use different radio link technologies. As shown in FIG. 2, both a UMTS terrestrial radio access network (UTRAN) 214 and a GSM BSS 218 can connect to the same core network 236.

The circuit switched domain 238 and the packet switched domain 240 of the core network 236 can each operate in parallel, and both domains can connect to different radio access networks simultaneously. The UTRAN 214 in the UMTS wireless access network can include multiple radio network subsystems (RNS) 216. Each RNS 216 can include a "Node B" 206/210 that transmits and receives radio frequency signals and a radio network controller (RNC) 208/212 that manages communication between the "Node B" 206/210 network elements and the core network 236. Unlike the MS 204 in the GSM radio access network, the UE 202 can connect to more than one radio network subsystem (RNS) 216 simultaneously. One RNS 216 can include a "serving" radio network controller (SRNC) 208 that maintains the logical connection between the UE 202 and the core network 236 through a primary Node B 206. A second RNS 216 can include a "drift" radio network controller (DRNC) 208 that provides additional radio link resources through a secondary Node B 210 that supplements the radio link through the primary Node B 206.

A UMTS wireless communication network can use a wireless communication radio link technology known as wideband code division multiple access (W-CDMA). W-CDMA transmissions can occupy a relatively wide bandwidth based on a direct sequence spread spectrum modulation. Transmissions between a UE 202 and an RNS 216 in a UMTS network can be modulated by a spreading code, and each UE 202 connected to the RNS 216 can use a different spreading code but transmit simultaneously using the same frequency spectrum. Received signals can be demodulated by correlating them with a correctly matched de-spreading code. As the set of spreading codes used in W-CDMA can be mutually orthogonal, signals intended for a particular UE can be separated from signals transmitted to other UE, even though all of the signals can overlap and use the same frequency spectrum simultaneously. UMTS spread spectrum signals can occupy a wider 5 MHz channel bandwidth compared with a narrower 200 kHz channel bandwidth used by GSM signals.

In order for the UE 202 to communication to the RNS 216, a radio resource, such as a radio access bearer (RAB) having a particular frequency and spreading code, can be allocated by the RNS 216 in response to a service request from the UE 202. Radio resources can be allocated when requested and available and de-allocated when not used in order to share the radio frequency spectrum among multiple UEs 202. To use the GPRS capability of the wireless communication network, the UE 202 can "attach" to the network and "activate" a packet data protocol (PDP) context. By attaching to the network, the UE 202 identifies itself and the wireless communication network 100 confirms the location of the UE 202. Activating the PDP context can enable IP traffic transfer through radio resources on an "air" interface between the UE 202 and the RNS 216. The UE 202 can obtain an IP address and can establish a logical connection with a quality of service (QoS) profile through the UMTS network. A UE 202 can have multiple PDP contexts active simultaneously, and each PDP context can use a different RAB.

Figure 3:
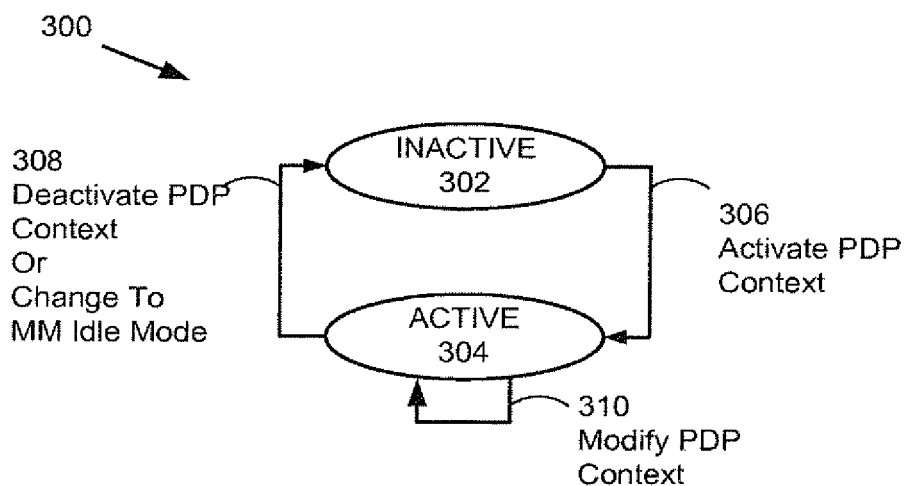
FIG. 3 illustrates a state transition diagram for a packet data connection of the mobile wireless communication device.

FIG. 3 illustrates a simple state diagram 300 for the UE 202. The UE 202 can be in an inactive state 302, such as in a mobile management (MM) idle mode when UE 202 is not attached to a GPRS mobility management system in the wireless communication network 100. The state of the UE 202 can change to an active state 304 when a PDP context is activated (transition 306). The UE 202 can remain in the active state 304 even when the PDP context is modified (transition 310), such as when a change to a QoS profile associated with the PDP context occurs. While in the active state 304, radio resources (e.g. radio access bearers) allocated to the UE 202 can be released at the request of the serving radio network controller (SRNC) 208 in the RNS 216 with which the UE 202 is associated. The PDP context can remain preserved by the core network (CN) 236 even when the associated RAB is released. In order to re-establish RABs for active PDP contexts that don't have associated RABs, the UE 202 can send a service request message to the RNS 216 asking for a new allocation of radio resources. Network congestion can result in no RABs being allocated, however, the UE 202 can remain in the active state. If the data connection is no longer required then the PDP context can be deactivated (transition 308), and the UE 302 can return to an inactive state 302.

Figure 4:
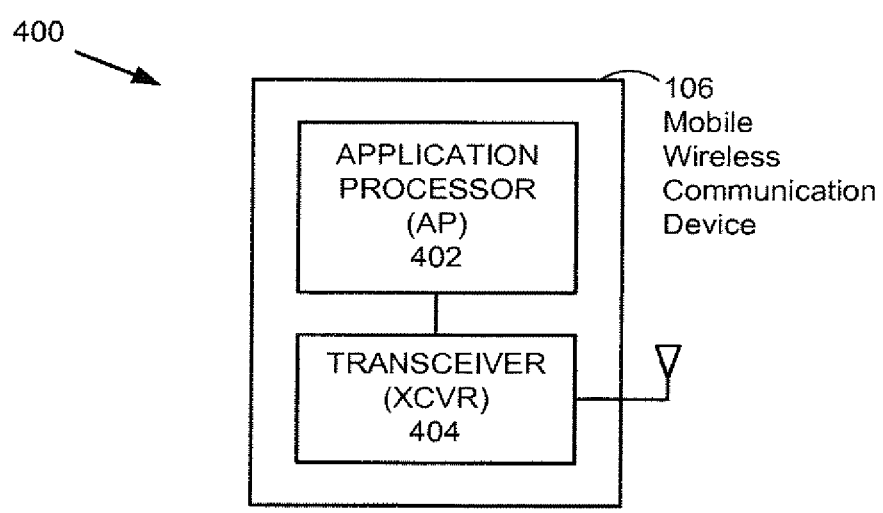
FIG. 4 illustrates components of the mobile wireless communication device.

FIG. 4 illustrates typical components of the mobile wireless communication device 106 such as the UE 202. An applications processor (AP) 402 can perform higher layer functions, such as maintaining an IP stack and requesting and releasing data connections. A transceiver (XCVR) 404 in the mobile wireless communication device 106 can transmit and receive lower layer packets that correspond to higher layer signaling and data packets through a radio "air" interface to the RNS 216 in the wireless communication network 100.

Figure 5:
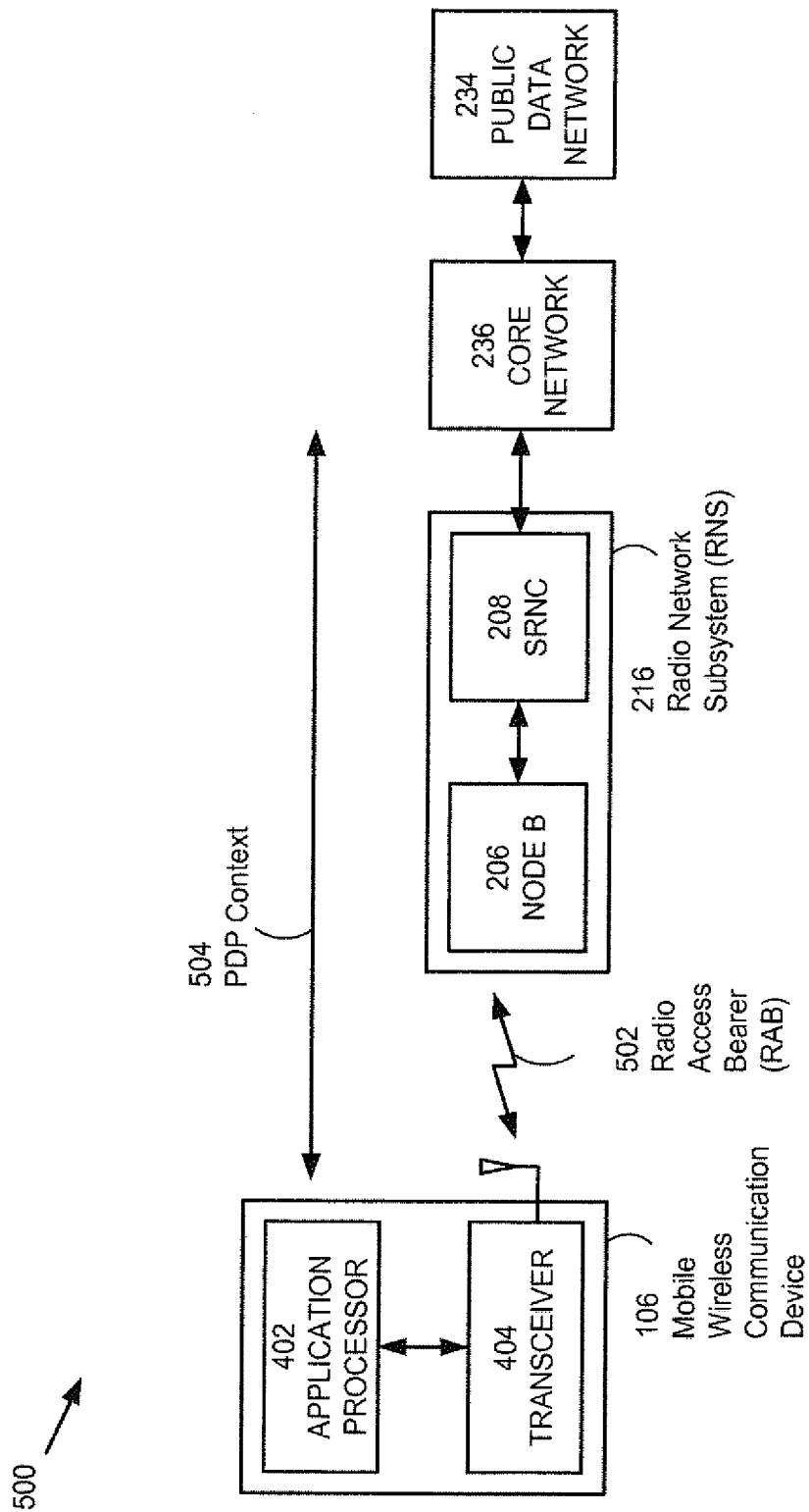
FIG. 5 illustrates connections of the mobile wireless communication device to elements of the wireless communication network.

FIG. 5 illustrates that a higher layer PDP context 504 can be established between the AP 402 in the mobile wireless communication device 106 (equivalently the UE 202) and the core network 236 in the wireless communication network 100. This higher layer PDP context 504 can be supported by a lower layer radio access bearer (RAB) 502 between the transceiver 404 and the Node B 206 within the radio network subsystem (RNS) 216. While the PDP context 504 can be active without any radio resources (lower layer RABs 502) allocated for the radio access portion of the wireless communication network 100, data packets cannot be communicated between the AP 402 and the public data network (PDN) 234 through the core network (CN) 236. An inactivity timer in the RNS 216 can release the "costly" radio resources for other mobile wireless communication devices to use when the data connection of the mobile wireless communication device 106 is idle, such as when the packet data buffer un the transceiver 404 is empty and a timer expires. The serving radio network controller (SRNC) 208 can send a signaling connection release based on the inactivity timer or in response to a signaling connection release indication from the mobile wireless communication device 106. The PDP context 504 can require significant time to set up, as multiple network components can be involved in the PDP context establishment. Thus the PDP context 504 can remain active even when no RAB is assigned. When the XCVR 404 receives additional higher layer packets from the AP 402 to transmit, the XCVR 404 can request radio resources on which to transport the new higher layer packets through an exchange of signaling messages as described next. Under normal network load conditions, establishing new radio access bearers 502 can be faster than setting up an entirely new PDP context 504.

Figure 6:
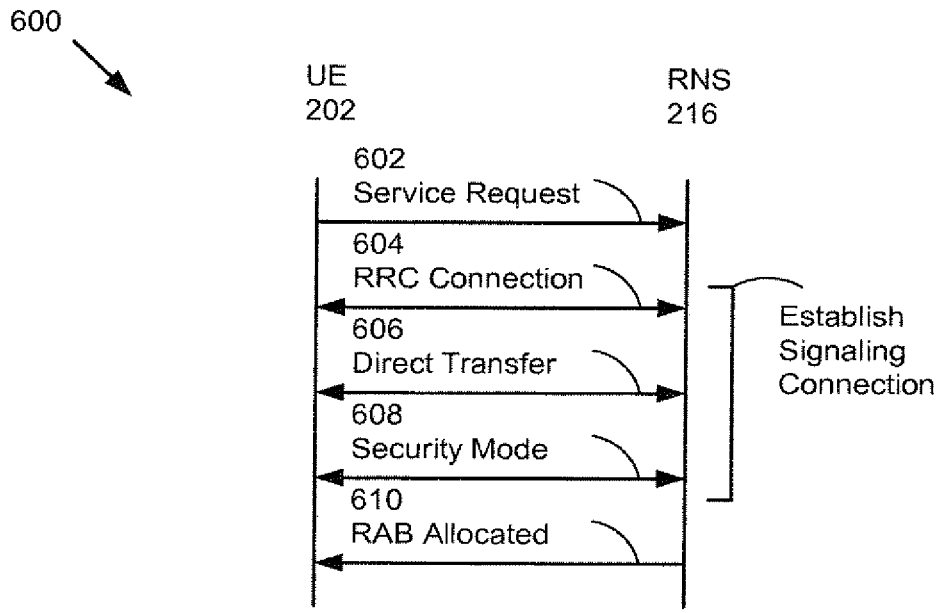
FIG. 6 illustrates a message sequence between the mobile wireless communication device and the wireless communication network for a successful radio resource allocation.

FIG. 6 illustrates a signaling message exchange 600 between the UE 202 and the RNS 216 to request allocation of radio resources on which to transport pending data packets. A service request 602 can be sent from the UE 202 to the RNS 216. Note that this signaling message exchange 600 can use signaling radio resources separate from those being requested to support data packet transport. The signaling radio resources can be shared by multiple UEs 202 and can provide only limited throughput capability, and thus can be incapable of supporting substantial packet data traffic. Several successive steps can occur to establish a signaling connection between the UE 202 and the RNS 216 including establishing a radio resource control (RRC) connection (step 604) with the SRNC 208 in the RNS 218, followed by direct transfer messaging to the CN 236 and a security mode procedure 608 to ensure authentication of the UE 202. After establishing the signaling connection, the RNS 216 can allocate 610 a radio access bearer (RAB), i.e. a radio resource, to the UE 202, and packet data transfer on the established data connection can occur. The series of steps in FIG. 6 illustrate a successful request for radio resource allocation to the UE 202.

Figure 7:
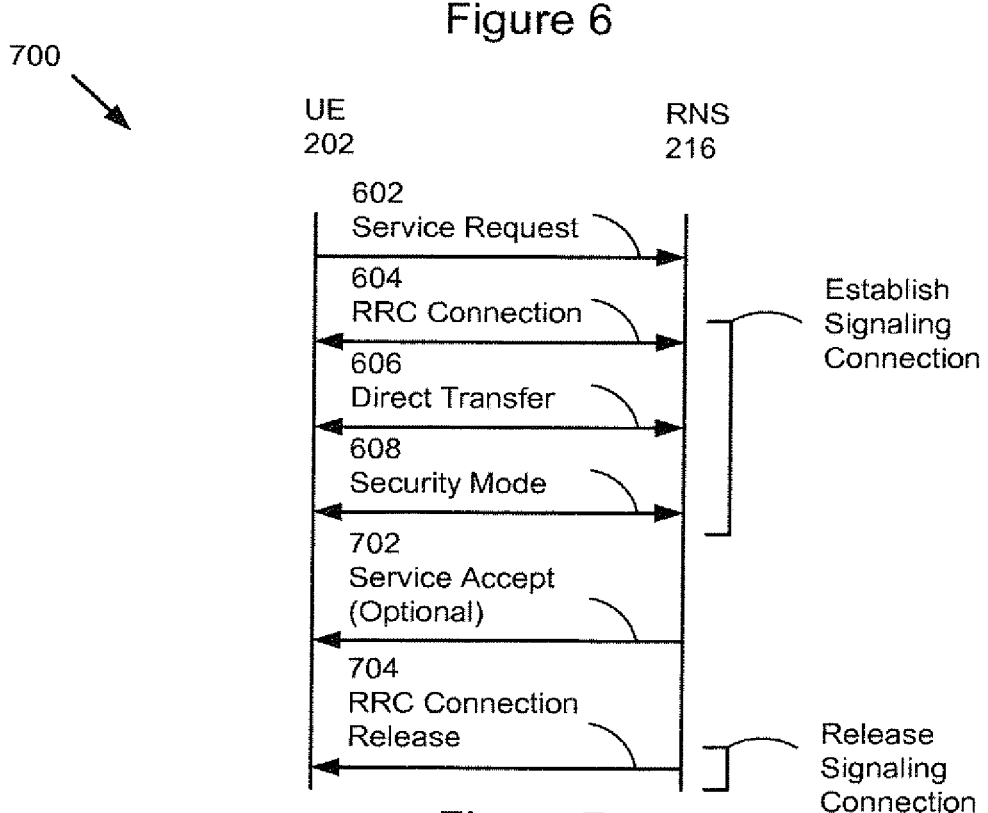
FIG. 7 illustrates a message sequence between the mobile wireless communication device and the wireless communication network for an unsuccessful radio resource allocation.

FIG. 7 illustrates an unsuccessful request for radio resource allocation for the UE 202, where the RNS 216 establishes a signaling connection and then releases the signaling connection by sending an RRC connection release message 704. In this case no radio resources are allocated to the LIE 202, and the UE 202 can be unaware of a reason for the lack of success. In some cases the RNS 216 can send an optional service accept message 702 after establishing the signaling connection and then subsequently release the RRC connection 704 without actually allocating radio resources.

In either case, the UE 202 cannot send data packets on the data connection as the radio access portion is not established.

Figure 8:
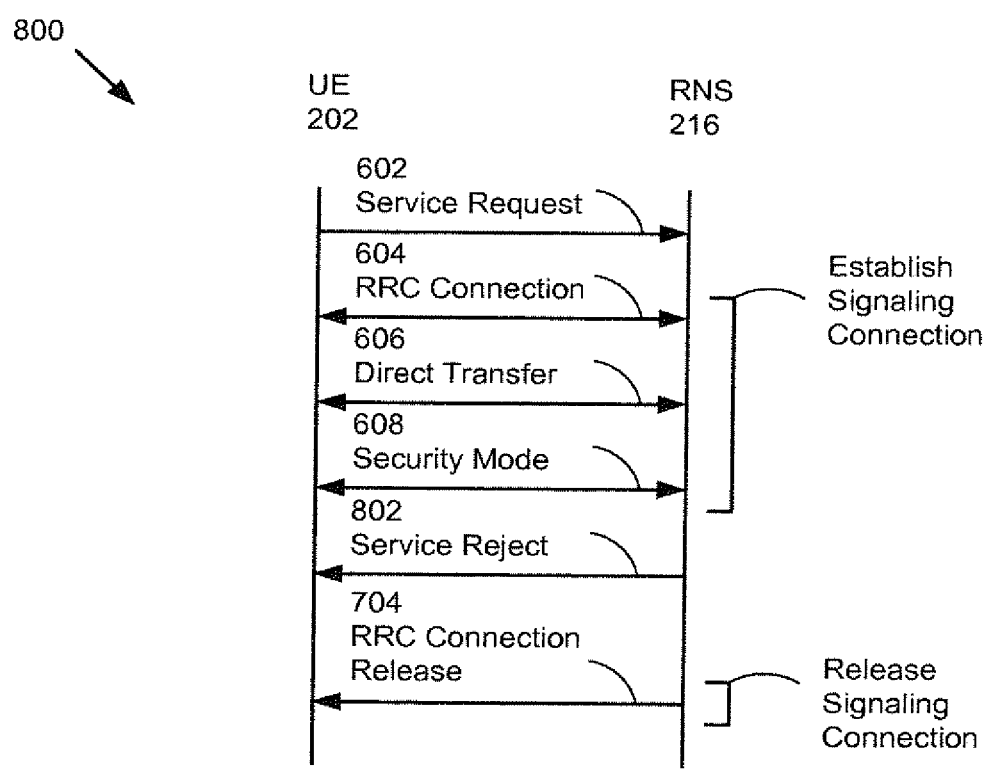
FIG. 8 illustrates another message sequence between the mobile wireless communication device and the wireless communication network for an unsuccessful radio resource allocation.
Figure 9:
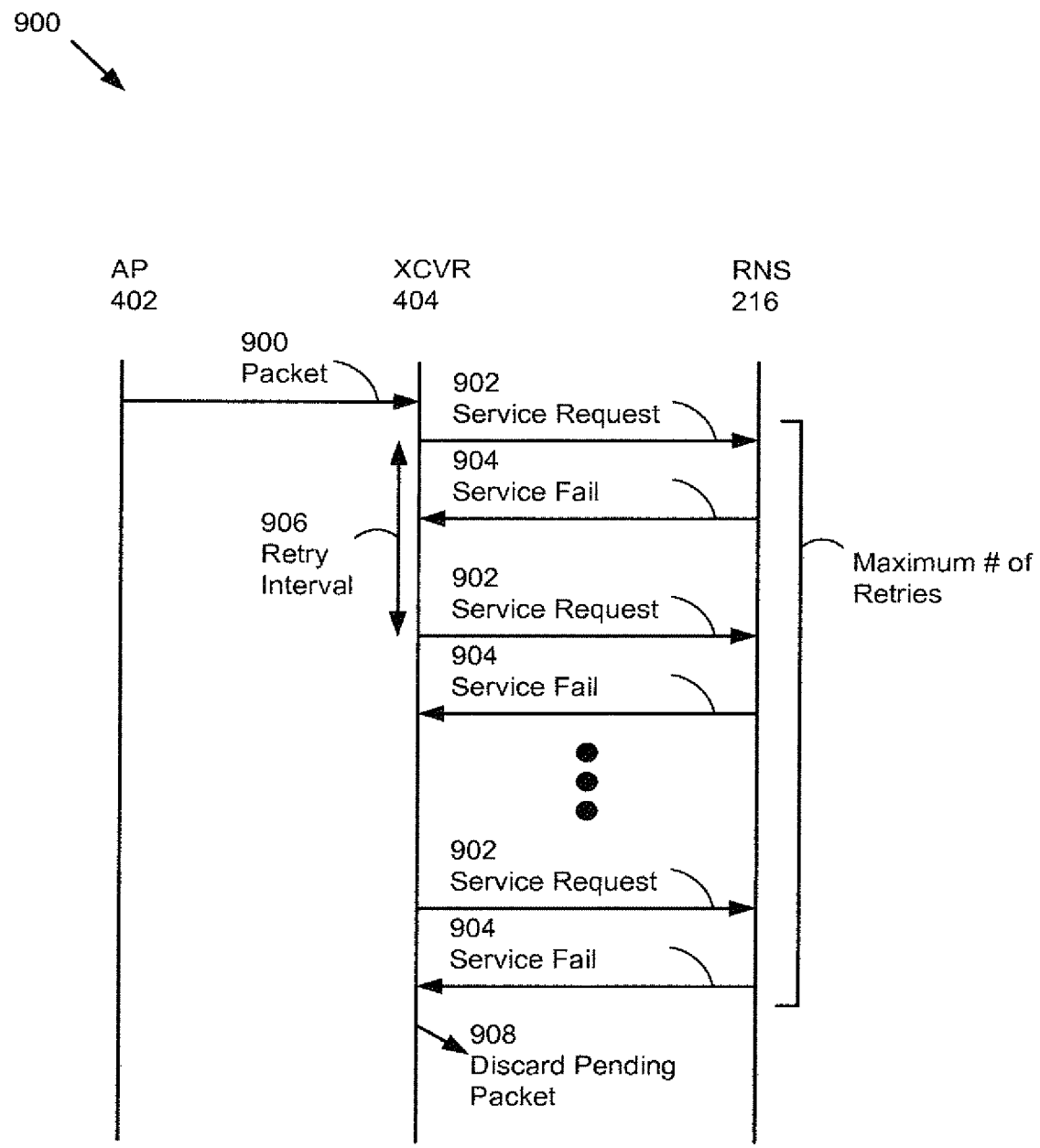
FIG. 9 illustrates a repeated service request sequence between the mobile wireless communication device and the wireless communication network for an unsuccessful radio resource allocation.

FIG. 8 illustrates another unsuccessful radio resource service request, where the RNS 216 sends a service reject message 802 after establishing the signaling connection. The service reject message 802 can include a reason for the service reject. The RNS 216 can subsequently release the signaling connection by sending an RRC connection release message 704. Again, no radio resources can be allocated to the UE 202. As the initial service request can be precipitated by a pending data packet, which can remain unsent and therefore continue to be pending in a data buffer in the UE 202, the UE 202 can generate repeated service requests as shown in FIG. 9 for a single pending packet 900. To simplify the diagram in FIG. 9, the steps that establish the signaling connection as shown in FIGS. 6-8 are not shown, but they can occur.

As illustrated in FIG. 9, a service request 902 can be followed by a service failure 904 without any radio resources being allocated to the UE 202. FIGS. 6-8 illustrated representative radio resource service request failures. The service failure response 904 from the RNS 216 can also be not sent by the RNS or not received by the XCVR 404 in the UE 202. Following each service request 902, the XCVR 404 in the UE 202 can wait a retry interval 906 before repeating the service request 902. The retry interval 906 can be specified by the UE 202. Up to a maximum number of service requests can be retried before the XCVR 404 can abandon the service request procedure and discard the pending packet (step 908). In an exemplary embodiment, the retry interval 906 can be set between 10 and 30 seconds apart and the maximum number of retries can be set for 2 to 4 for each pending packet 900. (Other non-zero integer values for the retry interval 906 and maximum number of retries can also be used.) A single pending packet 900 can result in a substantial number of signaling messages exchanged between the XCVR 404 and the RNS 216 during multiple attempts to have radio resources allocated to the UE 202 on which to transport the pending data packet.

Figure 10:
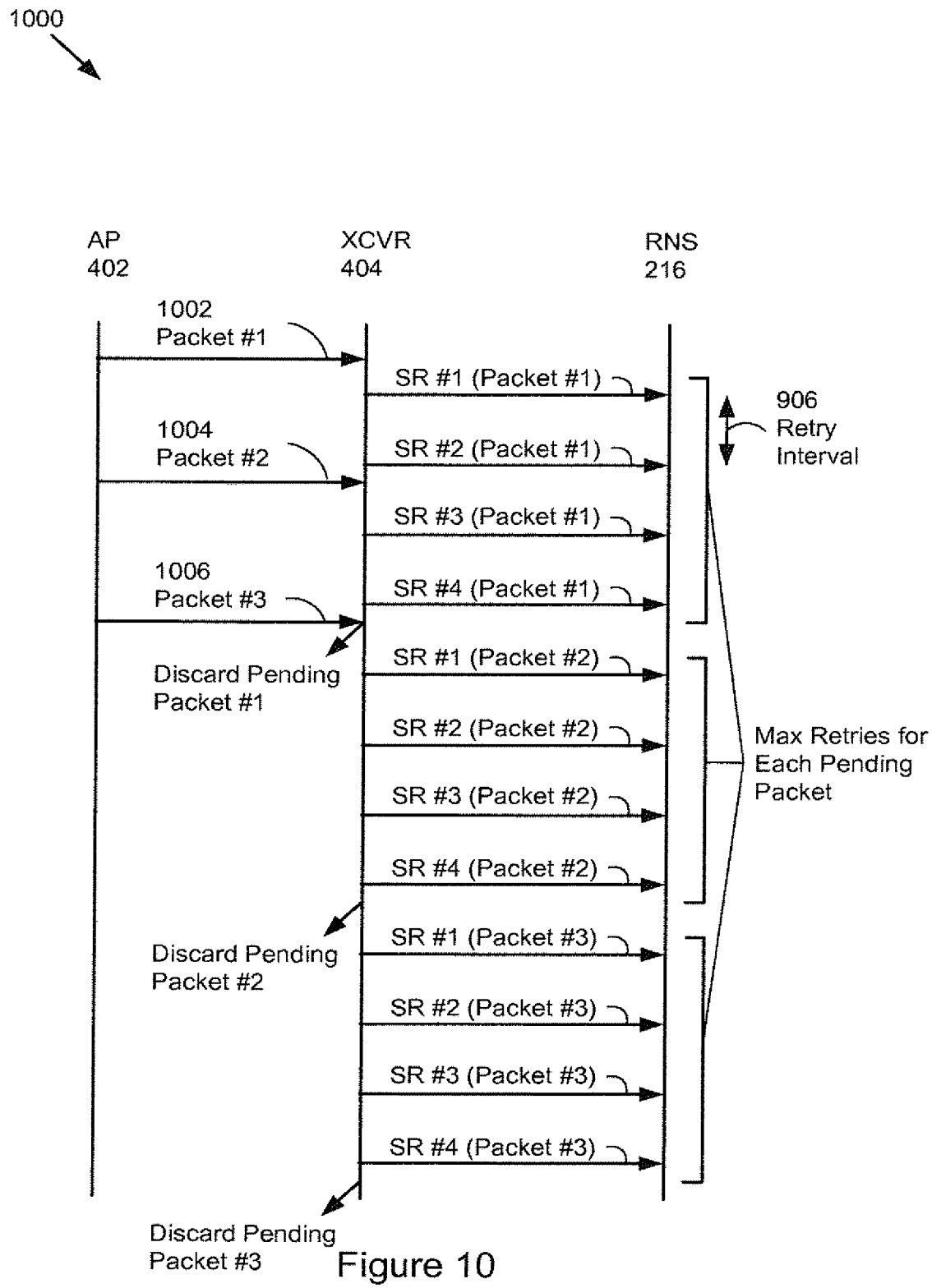
FIG. 10 illustrates a repeated service request sequence resulting from a series of pending data packets in the mobile wireless communication device.

The higher layer functions in the AP 402 of the UE 202 can be unaware of the lack of radio resource allocation and can continue to send additional data packets to the XCVR 404 for transmission, which can result in a deep backlog of data packets. Each data packet 900 can generate a new set of signaling messages for a service request 902 adding to the network congesting by overloading signaling radio resources. FIG. 10 illustrates four pending data packets 1002/1004/1006, and each data packet generates a maximum number of service request (SR) retries, with successive service requests spaced apart by a retry interval 906. With a relatively deep data packet buffer in the XCVR 404, the AP 402 can send more than 50-100 data packets within one minute to the XCVR 404 resulting in several hundred service requests being generated by the XVCR 404 to the RNS 216. As a result an excessively large number of signaling messages can be transmitted between the XCVR 404 and the RNS 216 and can overload an already congested radio access network. As the PDP context can remain active when radio resources are unavailable, the higher layer applications in the AP 402 can be unaware of the radio resource blockage and can automatically retransmit data packets to the XCVR 404 for transmission to the RNS 216 when no acknowledgements for the earlier data packets are received.

Figure 11:
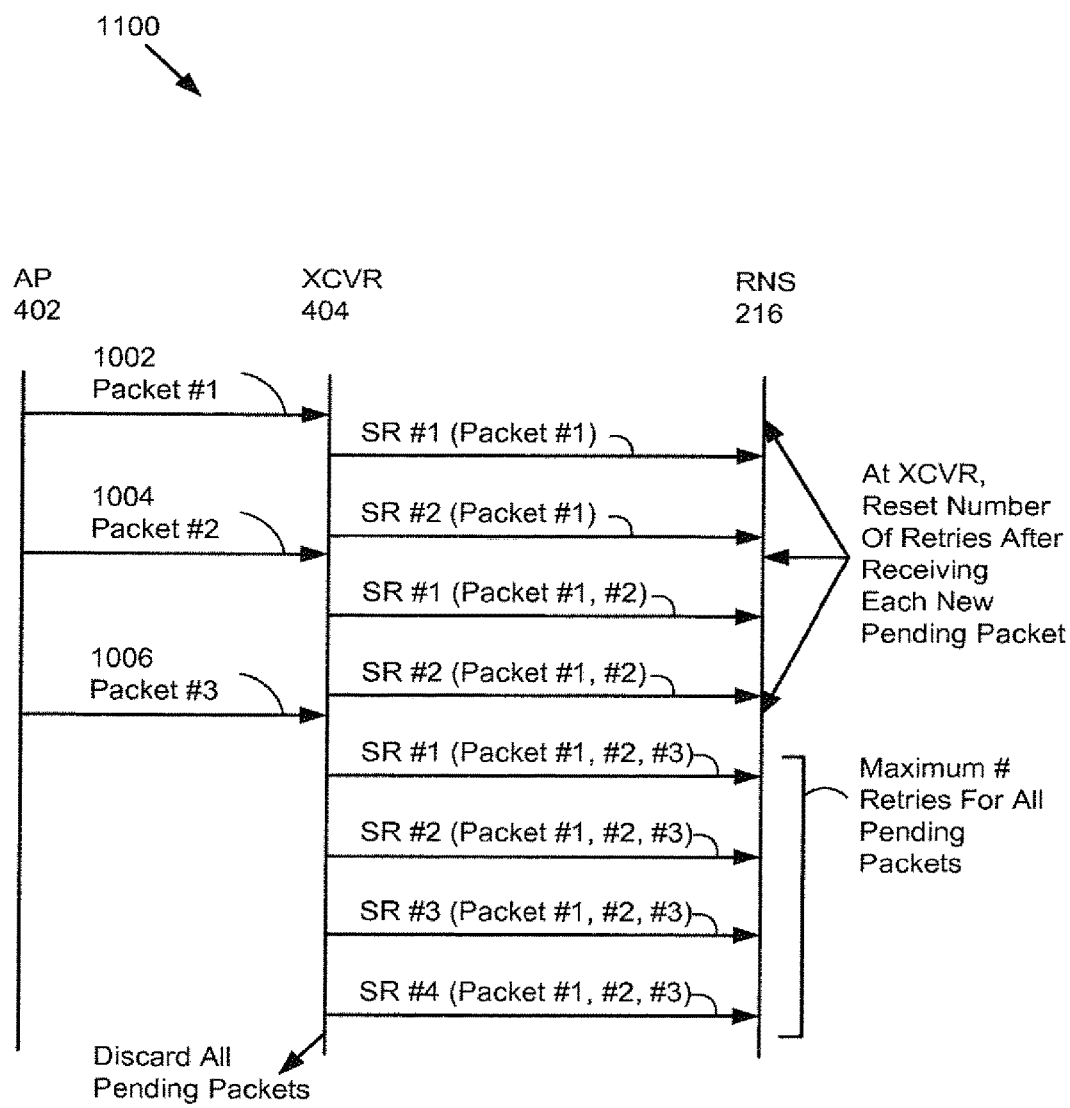
FIG. 11 illustrates a service request sequence with limited repeated service requests for the sequence of pending data packets of FIG. 10.

FIG. 11 illustrates a message sequence 1200 for a method with modified radio resource signaling between the XCVR 404 in the UE 202 and the RNS 216 in the wireless communication network 100. A new set of service requests for each pending higher layer data packet can be not required, as the same radio resources for which allocation is sought can be used for all pending data packets. Rather than send a maximum number of service request retries for each pending data packet, a retry counter can be reset when each new higher layer data packet is received by the XCVR 404 from the AP 402. The maximum number of retries can then be applied for all pending data packets rather than for each pending data packet. As shown in FIG. 11, a first data packet 1002 can initiate a first sequence of service requests. While the first sequence of service requests is ongoing, a second data packet 1004 can be received by the XCVR 404, and a new second sequence of service requests can start. The new second sequence of service requests can encompass both the newly received second data packet 1004 and the first received data packet 1002. The first sequence of service requests for the first packet 1002 only can effectively end.

During the second sequence of service requests, a third data packet 1006 can be received by the XCVR 404 triggering yet another new sequence of service requests that can apply to all three pending data packets. If no radio resources are allocated by the RNS 216, then the XCVR 404 can discard all pending data packets after sending a sequence of service requests that includes a maximum number of service request retries. The sequence of service requests at any time can apply to all currently pending data packets.

The data packet buffer in the XCVR 404 can include a threshold that limits the total number of pending data packets so that the data packet buffer can avoid an overflow. When the number of data packets in the data buffer exceeds the threshold, then as new data packet are received, the oldest data packets can be discarded leaving room for the newer data packets in the data buffer. A timestamp can also be associated with a data packet, and packets that remain pending longer than a time threshold can be discarded.

Figure 12:
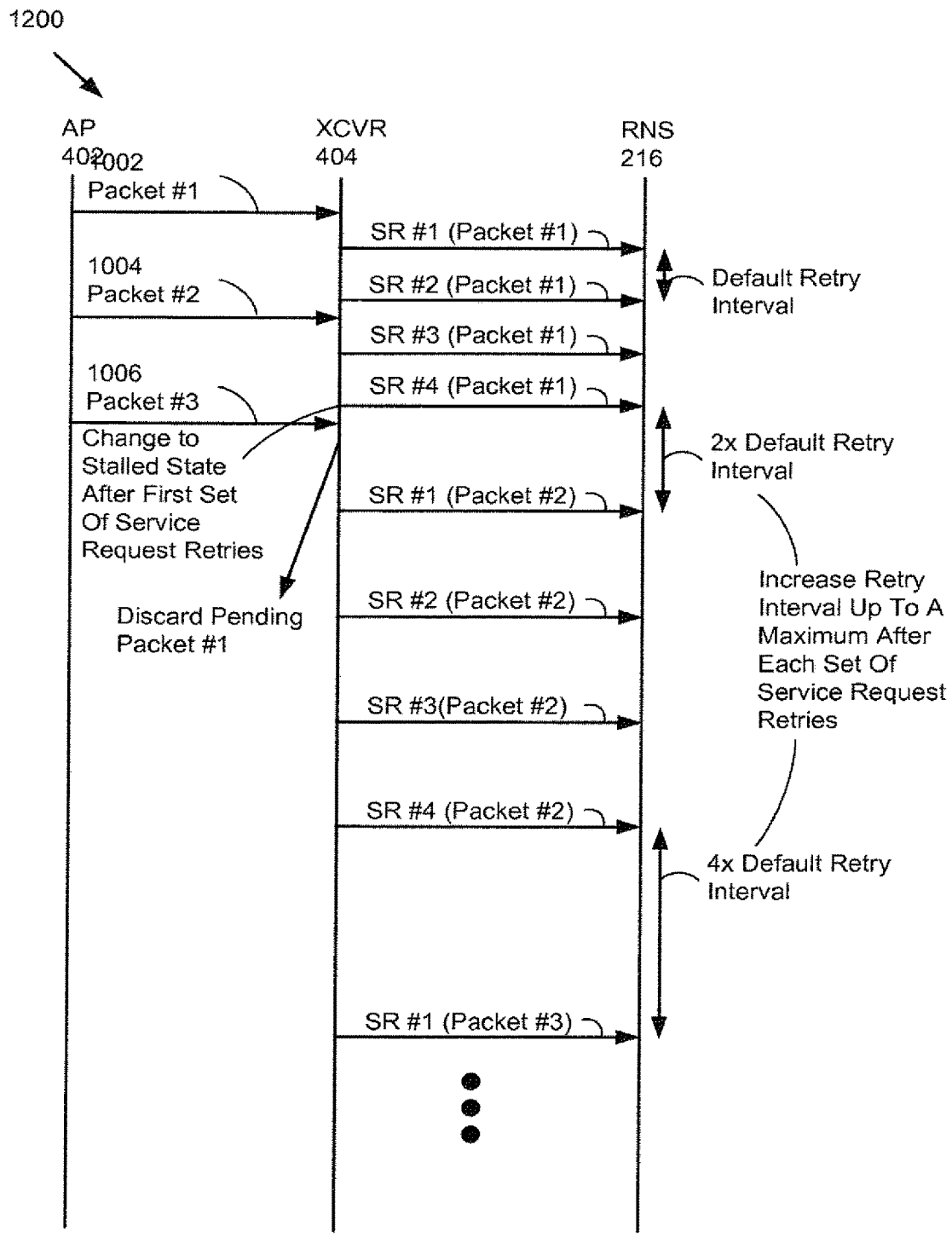
FIG. 12 illustrates an alternative service request sequence with increasingly delayed service requests for the sequence of pending data packets of FIG. 10.

FIG. 12 illustrates a second sequence 1200 for another method to modify radio resource signaling between the XCVR 404 and the RNS 216. After sending a first set of service requests for a first pending data packet 1002, a packet data control procedure (PDCP) in the UE 202 can change to a "stalled" state that can indicate that the radio access portion of the wireless communication network has not allocated radio resources in response to repeated service requests. While in the stalled state, the UE 202 can change the threshold for the pending data packet buffer in the XCVR 404 to a smaller value, which can result in older data packets being discarded earlier as the pending data packet buffer can overflow more quickly. For example, if the packet data buffer is reduced to a threshold of only two data packets after changing to a stalled state, then when packet #3 arrives, pending packet #1 can be discarded due to data packet buffer overflow.

The retry interval between successive service requests for each set of multiple service requests can also increase after each multiple unsuccessful service request sequence. For example the retry interval can double after each set of service requests up to a maximum retry interval value. As a representative embodiment, the default retry interval can be 30 seconds with a default number of retries for each set of service requests set to 4 in a service request procedure. After the first four service request retries, the default retry interval can increase to 60 seconds and then again to 120 seconds. For a next service request procedure (not shown) the retry interval can max out at a maximum retry interval value of 180 seconds (less than double the previous retry interval).

The maximum retry interval value can be set to a level that minimizes overall signaling loads on the wireless communication network, while still ensuring that recovery from congestion is not adversely affected.

When the RNS 216 allocates radio access bearers to the UE 202, the PDCP can change back to a "normal" state from the "stalled" state, and the threshold of the pending data packet buffer can be reset to a default value. The retry interval can also be reset to a default value. In addition to the two service request sequences shown in FIGS. 11 and 12, the XCVR 404 can notify the AP 402 when a stalled network condition exists, as determined by the XCVR 404. After recognizing the stalled network condition, the AP 402 can choose to limit the frequency and number of data packets sent to the XCVR 404 until the stalled network condition subsides. Limiting the amount of data packets sent to the XCVR 404 can limit the number of service requests generated by the XCVR 404 in response to receiving the data packets, thereby decreasing the signaling traffic on the radio access interface until network congestion improves.

Figure 13:
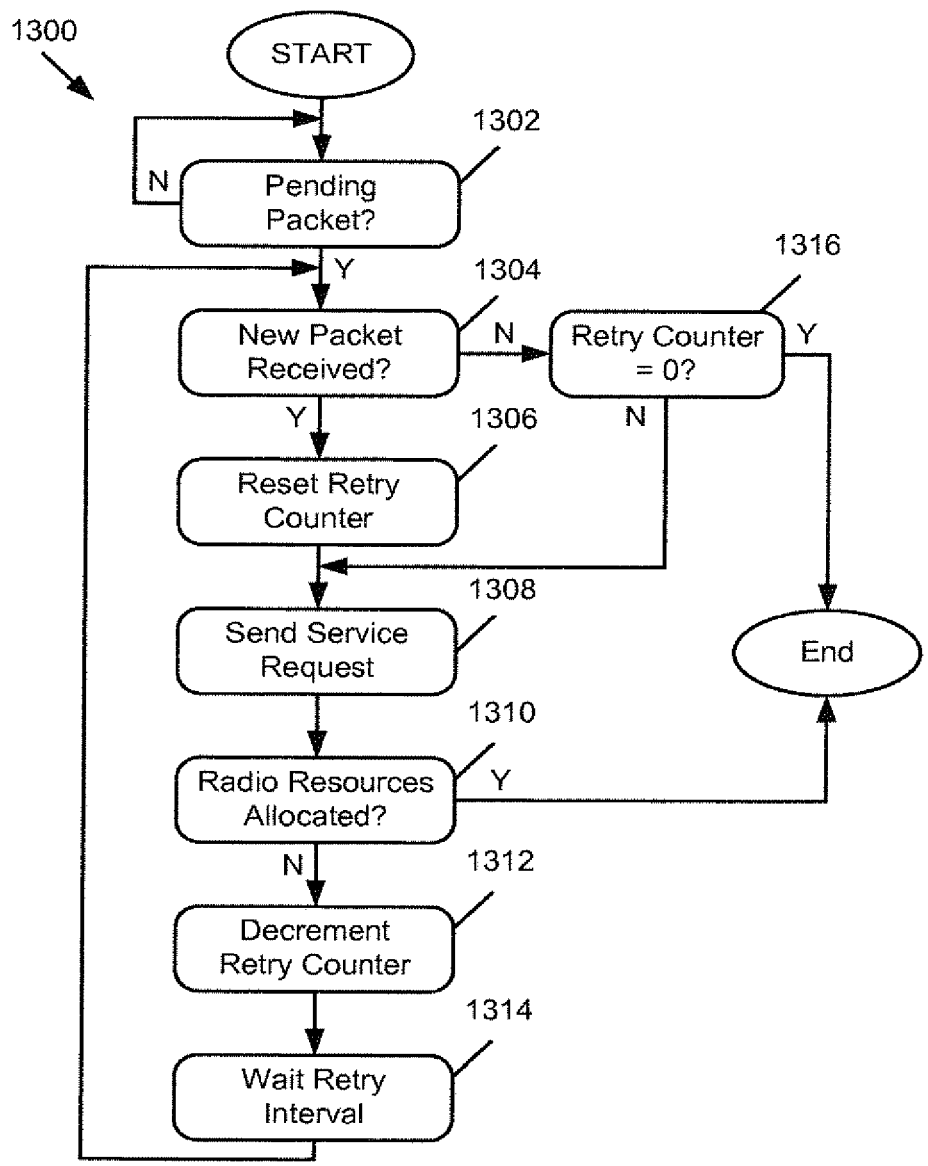
FIG. 13 illustrates a method to modify radio resource signaling between the mobile wireless communication device and the radio network subsystem of the wireless communication network during radio access network congestion.

FIG. 13 illustrates a representative method 1300 to modify radio resource signaling to account for radio access network resource congestion. The method 1300 illustrated in FIG. 13 can correspond to the sequence 1100 shown in FIG. 11. In step 1302, the XCVR 404 in the UE 202 can check whether any pending data packets exist, sent from a higher layer process in the AP 402 of the UE 202 for transmission to the wireless communication network. When one or more pending packets exist in the buffer, the XCVR 404 can determine in step 1304 if a new data packet was received in the pending data packet buffer. Any new data packets received can cause a retry counter to be reset to a default maximum retry counter value in step 1306. If no new data packets were received, then the XCVR 404 can determine if the retry counter equals zero in step 1316, which can indicate that a maximum number of retries have occurred for the pending data packets. The method can terminate (and pending data packets can be discarded). If the maximum number of service request retries has not occurred, i.e. the retry counter is not zero, or after resetting the retry counter in step 1306 following the receipt of a new data packet in step 1304, a service request can be sent in step 1308 by the XCVR 404 to the RNS 216 requesting radio resources on which to transmit the pending data packets to the wireless communication network. If a radio access bearer (RAE) is allocated in step 1310, then the method can end; however, if no radio resources are allocated then in step 1312 the retry counter can be decremented. After waiting for a retry interval in step 1314, the XCVR 404 can return to check if a new data packet was received, thereby restarting the service request retry procedure. The method 1300 shown in FIG. 13 can result in at least a maximum retry value number of retries for each pending data packet. Thus all pending data packets can receive at least a minimum number of service request retries. Each service request for radio resources can apply to all pending data packets in the data buffer in the XCVR 404.

Figure 14:
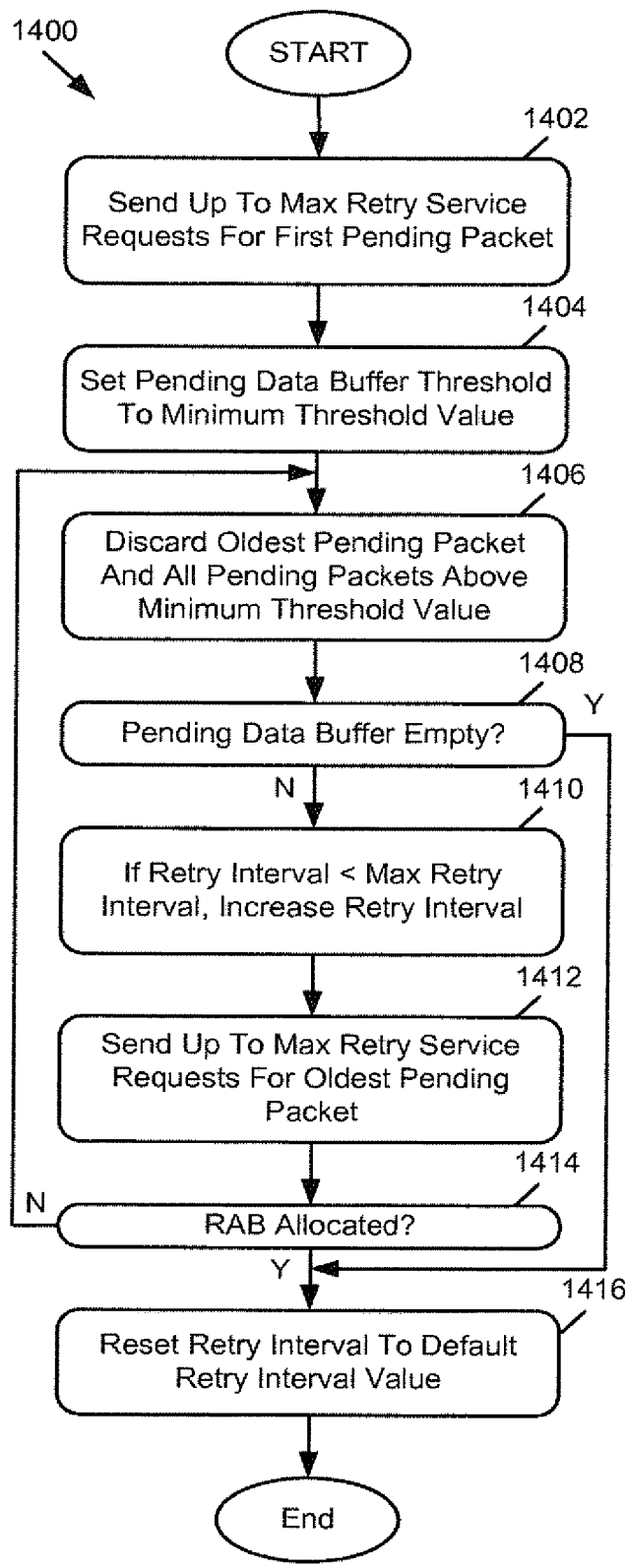
FIG. 14 illustrates a second method to modify radio resource signaling between the mobile wireless communication device and the radio network subsystem of the wireless communication network during radio access network congestion.

FIG. 14 illustrates a second method 1400 to modify radio resource signaling when requesting radio resources when there radio access network resource congestion exists. In step 1402, the XCVR 404 in the UE 202 can send up to a maximum retry value of service requests for radio access resources for a first pending data packet received from the AP 402. If no radio access resources are allocated during step 1402 by the RNS 216, then the UE 202 can identify that the radio access network is congested (i.e. in a stalled state). In the stalled state, the UE 202 can lower the threshold on the pending data packet buffer in step 1404, thereby causing older pending data packets to be flushed from the pending data packet buffer more quickly. In step 1406 all pending data packets above the lowered threshold can be discarded. The oldest pending data packet, which can correspond to the first pending data packet in the first cycle through step 1406 or the most recent data packet for which a series of service requests has been made, can also be discarded even if below the lowered threshold. A pending data packet can be discarded after the maximum number of service request retries have occurred for the pending data packet. After discarding data packets, in step 1408, the XCVR 404 can determine if there are any remaining pending data packets in the data buffer. If the pending data packet buffer is empty, then the process can terminate.

If pending data packets still remain in the pending data packet buffer, then the XCVR 404 in step 1410 can increase the retry interval between successive service requests if the current retry interval is less than a maximum retry interval value. The XCVR 404, in step 1412, can then send up to a maximum number of service requests, each successive service request being spaced apart by the retry interval value. The set of service requests in step 1412 can apply to the oldest pending data packet in the pending data packet buffer. In step 1414, the XCVR 404 can determine if radio resources (i.e. radio access bearers) have been allocated by the RNS 216. If no radio resources have been allocated, then in step 1406 the oldest pending data packet can be discarded and the process can repeat. Once radio access bearers have been allocated or the pending data packet buffer empties, in step 1416 the retry interval can be reset to a default retry interval value and the process can end.

In addition to the methods illustrated in FIGS. 13 and 14, other methods can be used alone or in combination to lower the number of service requests for radio access resources. The lower layer baseband process in the XCVR 404 can notify the higher layer process (e.g. IP stack management) in the AP 402 of the UE 202 that a stalled state (i.e. congested network with inadequate radio access resources allocated) exists. The stalled state can be declared by the XCVR 404 after a certain number of service requests for radio resources have been submitted within a certain time period. The higher layer process in the AP 402 can then manage the number of data packets sent for transmission as well as the time periods between successive data packets. This management of transmission by the higher layer process in the AP 402 can lower the number of data packets pending in the pending data packet buffer of the XCVR 404, thereby lowering the number and frequency of service requests for radio resources. In a representative embodiment, the higher layer process can use a longer back off timer during a stalled state to spread out successive TCP (Transmission Control Protocol) SYN packets that seek to initiate a TCP connection. The higher layer process can also wait longer periods between successive DNS (Domain Name Server) queries that look for IP addresses. The higher layer process in the AP 402, however, should continue to send at least some data packets to the lower layer process in the XCVR 404 and should not wait for an indication that the stalled condition has resolved. A steady, if infrequent, stream of data packets can be required to ensure repeated service requests will eventually result in an allocation of radio resources from the RNS 216. Without any pending data packets, the XCVR 404 would not send any service requests, and without service requests, no radio resources would be allocated. This could result in a deadlocked condition as past service requests for radio resources by the UE 202 can essentially expire once the RRC connection is released by the RNS 216.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for managing data packets in a buffer by a mobile device during periods of congestion in a wireless network, the method comprising:
    by the mobile device, while the buffer contains one or more pending data packets for transmission via a packet data protocol (PDP) context:
    determining whether one or more new pending data packets are received in the buffer;
    resetting a retry counter to a default maximum retry counter value, when the buffer receives one or more new pending data packets;
    determining whether the retry counter equals zero, when the buffer does not receive any new pending data packets;
    transmitting, to the wireless network, a service request for radio resource allocation for transmission via the PDP context of the one or more pending data packets in the buffer;
    decrementing the retry counter, when the mobile device is not allocated, in response to the service request, radio resources by which to transmit the one or more pending data packets in the buffer;
    repeating:
        the determining whether one or more new pending data packets are received in the buffer;
        the resetting the retry counter, when the buffer receives one or more new pending data packets,
        the determining whether the retry counter equals zero, when the buffer does not receive any new pending data packets,
        the transmitting the service request for radio resource allocation, and
        the decrementing the retry counter, when no radio resources are allocated in response to the service request,
    until the mobile device is allocated radio resources by which to transmit the one or more pending data packets or the retry counter reaches zero; and
    discarding any pending data packets in the buffer, when the retry counter reaches zero.

2. The method of claim 1, wherein the PDP context is for a Universal Mobile Telecommunications System (UMTS) network technology, and the requested radio resources comprise one or more radio access bearers (RABs) of the UMTS network technology.

3. The method of claim 1, wherein each service request for radio resource allocation applies to all pending data packets in the buffer of the mobile device.

4. The method of claim 1, further comprising:
    by the mobile device:
    waiting for a retry interval after the decrementing the retry counter and before repeating the determining whether new data packets are received in the buffer.

5. A mobile device configured to manage data packets in a buffer while operating in communication with a wireless network, the mobile device comprising:
    a wireless transceiver configured to communicate with the wireless network; and
    processing logic, in data communication with the wireless transceiver, the processing logic configured to cause the mobile device to:
    while the buffer contains one or more pending data packets for transmission via a packet data protocol (PDP) context:
    reset a retry counter to a default maximum retry counter value, when the buffer receives one or more new pending data packets;
    determine whether the retry counter equals zero, when the buffer does not receive any new pending data packets;
    transmit, to the wireless network, a service request for radio resource allocation for transmission via the PDP context of the one or more pending data packets in the buffer;
    decrement the retry counter, when the mobile device is not allocated, in response to the service request, radio resources by which to transmit the one or more pending data packets in the buffer;
    repeat:
        determining whether one or more new data packets are received in the buffer;
        resetting the retry counter, when the buffer receives one or more new pending data packets,
        determining whether the retry counter equals zero, when the buffer does not receive any new pending data packets,
        transmitting the service request for radio resource allocation, and
        decrementing the retry counter, when no radio resources are allocated in response to the service request,
    until the mobile device is allocated radio resources by which to transmit the one or more pending data packets or the retry counter reaches zero; and discard any pending data packets in the buffer, when the retry counter reaches zero.

6. The mobile device of claim 5, wherein each service request for radio resource allocation applies to all pending data packets in the buffer of the mobile device.

7. The mobile device of claim 5, wherein the PDP context is for a Universal Mobile Telecommunications System (UMTS) network technology, and the requested radio resources comprise one or more radio access bearers (RABs) of the UMTS network technology.

8. The mobile device of claim 5, wherein the processor is further configured to cause the mobile device to:
wait for a retry interval after the decrementing the retry counter and before repeating the determining whether new data packets are received in the buffer.

9. A non-transitory computer-readable medium storing instructions that, when executed by one or more processors of a mobile device, cause the mobile device to:
while a buffer of the mobile device contains one or more pending data packets for transmission via a packet data protocol (PDP) context:
determine whether one or more new pending data packets are received in the buffer;
reset a retry counter to a default maximum retry counter value, when the buffer receives one or more new pending data packets;
determine whether the retry counter equals zero, when the buffer does not receive any new pending data packets;
transmit, to a wireless network, a service request for radio resource allocation for transmission via the PDP context of the one or more pending data packets in the buffer;
decrement the retry counter, when the mobile device is not allocated, in response to the service request, radio resources by which to transmit the one or more pending data packets in the buffer;
repeat:
determining whether new one or more pending data packets are received in the buffer;
resetting the retry counter, when the buffer receives one or more new pending data packets,
determining whether the retry counter equals zero, when the buffer does not receive any new pending data packets,
transmitting the service request for radio resource allocation, and
decrementing the retry counter, when no radio resources are allocated in response to the service request,
until the mobile device is allocated radio resources by which to transmit the one or more pending data packets or the retry counter reaches zero; and
discard any pending data packets in the buffer, when the retry counter reaches zero.

10. The non-transitory computer-readable medium of claim 9, wherein each service request for radio resource allocation applies to all pending data packets in the buffer of the mobile device.

11. The non-transitory computer-readable medium of claim 9, wherein the PDP context is for a Universal Mobile Telecommunications System (UMTS) network technology, and the requested radio resources comprise one or more radio access bearers (RABs) of the UMTS network technology.

12. The non-transitory computer-readable medium of claim 9, wherein execution of the plurality of instructions further causes the mobile device to:
wait for a retry interval after the decrementing the retry counter and before repeating the determining whether new data packets are received in the buffer.

* * * * *